(12) United States Patent
Pieterse

(10) Patent No.: US 8,734,746 B2
(45) Date of Patent: May 27, 2014

(54) METHOD FOR THE DECOMPOSITION OF $N_2O$, CATALYST FOR IT, AND THE PREPARATION OF THIS CATALYST

(75) Inventor: Johannis Alouisius Zacharias Pieterse, Alkmaar (NL)

(73) Assignee: Stichting Energieonderzoek Centrum Nederland, Petten (NL)

( * ) Notice: Subject to any disclaimer, the term of this patent is extended or adjusted under 35 U.S.C. 154(b) by 713 days.

(21) Appl. No.: 13/003,396

(22) PCT Filed: Jul. 10, 2009

(86) PCT No.: PCT/NL2009/050420
§ 371 (c)(1),
(2), (4) Date: Mar. 17, 2011

(87) PCT Pub. No.: WO2010/005311
PCT Pub. Date: Jan. 14, 2010

(65) Prior Publication Data
US 2011/0158877 A1    Jun. 30, 2011

(30) Foreign Application Priority Data
Jul. 11, 2008 (NL) ..................... 2001788

(51) Int. Cl.
*C01B 21/02*  (2006.01)
*B01D 53/94*  (2006.01)
*B01J 29/68*  (2006.01)
*B01J 29/072*  (2006.01)
*B01J 29/76*  (2006.01)
*B01J 29/74*  (2006.01)

(52) U.S. Cl.
CPC ............ *C01B 21/02* (2013.01); *B01D 53/9413* (2013.01); *B01J 29/68* (2013.01); *B01J 29/7415* (2013.01); *B01J 29/7615* (2013.01)

USPC ................................. 423/239.2; 502/66

(58) Field of Classification Search
USPC ......................... 502/66; 423/239.2
See application file for complete search history.

(56) References Cited

U.S. PATENT DOCUMENTS

| | | | |
|---|---|---|---|
| 6,274,107 B1 * | 8/2001 | Yavuz et al. | 423/213.5 |
| 7,459,135 B2 * | 12/2008 | Pieterse et al. | 423/239.1 |
| 7,704,474 B2 * | 4/2010 | Pieterse et al. | 423/239.2 |
| 7,901,648 B2 * | 3/2011 | Pieterse et al. | 423/239.2 |
| 2007/0199302 A1 | 8/2007 | Yavuz et al. | |

FOREIGN PATENT DOCUMENTS

| | | |
|---|---|---|
| DE | 102006013234 A1 | 11/2007 |
| JP | 2006154611 A | 6/2006 |
| WO | 2005110582 A1 | 11/2005 |
| WO | 2007004774 A1 | 1/2007 |
| WO | 2007107371 A2 | 9/2007 |

OTHER PUBLICATIONS

International Search Report, dated Oct. 29, 2009, from corresponding PCT application.

* cited by examiner

*Primary Examiner* — David M Brunsman
(74) *Attorney, Agent, or Firm* — Young & Thompson

(57) ABSTRACT

A method for the catalytic decomposition of $N_2O$ in an $N_2O$- and $NO_x$-containing gas in the presence of a catalyst, wherein the catalyst contains a zeolite that has been loaded with a first metal chosen from a group of noble metals consisting of ruthenium, rhodium, palladium, silver, rhenium, osmium, iridium, platinum and gold, and with a second metal chosen from a group of transition metals consisting of chromium, manganese, iron, cobalt, nickel and copper, and in that the loading of the zeolite with these metals is effected by loading the zeolite with the noble metal and the transition metal simultaneously, also relating to a catalyst for this method and to a method for the preparation of the catalyst.

19 Claims, No Drawings

METHOD FOR THE DECOMPOSITION OF N₂O, CATALYST FOR IT, AND THE PREPARATION OF THIS CATALYST

This application is a 371 of PCT/NL09/50420, filed Jul. 10, 2009.

FIELD OF THE INVENTION

The present invention relates to a method for the catalytic decomposition of $N_2O$ in a gas containing $N_2O$ and $NO_x$. The invention also relates to a catalyst for it, as well as to the preparation of this catalyst.

BACKGROUND

Dinitrogen oxide or laughing gas ($N_2O$) substantially contributes to the greenhouse effect and has a high Global Warming Potential (the extent to which a molecule contributes to the greenhouse effect in comparison with a molecule of $CO_2$). A policy to reduce the emission of greenhouse gases has been developed in the past few years. Various important sources of $N_2O$ emission have been identified: farming, the industrial production of the precursors of nylon (adipic acid and caprolactam), the production of nitric acid, and motor vehicles fitted with a three-way catalyst.

Different catalytic and non-catalytic techniques can be used to make laughing gas harmless. Various catalysts are known for example for the catalytic decomposition or conversion of $N_2O$ into $N_2$ and $O_2$ (for example JP Application No. Hei-06-154611, which describes catalysts on a carrier basis, with transition metals and noble metals). However, this reaction with catalysts as claimed in the prior art is greatly inhibited by the presence of oxygen and water, which occur in the waste gases of virtually all the $N_2O$ sources mentioned above.

Another example is described in WO 2005/110582. This document describes a method for the catalytic decomposition of $N_2O$ in an $N_2O$-containing gas in the presence of a catalyst, where the catalyst contains a zeolite that is loaded with a first metal chosen from a group of noble metals comprising ruthenium, rhodium, palladium, silver, rhenium, osmium, iridium, platinum and gold, and with a second metal chosen from a group of transition metals comprising chromium, manganese, iron cobalt, nickel and copper, and in which method the loading of the zeolite with metals is effected by loading the zeolite first with the noble metal and then with the transition metal.

Selective catalytic reduction is a promising alternative. Various catalysts are known from the literature for the reaction of $N_2O$ with reducing agents such as alkenes ($C_nH_{2n}$), alcohols or ammonia. The addition of saturated hydrocarbons ($C_nH_{2n+2}$) is technically and economically preferred to the use of the reducing agents mentioned above. Natural gas ($CH_4$) and LPG (a mixture of $C_3H_8$ and $C_4H_{10}$) are attractive in this connection.

SUMMARY OF THE INVENTION

A disadvantage of the method involving catalysts that can reduce $N_2O$ with the aid of hydrocarbons is that extra facilities are needed for the hydrocarbons, and that hydrocarbons and/or CO may be released. From the environmental point of view, an extra catalyst is often employed to prevent the emission of hydrocarbons.

Another disadvantage of many well-known catalysts used for the decomposition of $N_2O$ is that they are often unstable and/or they become deactivated by the presence of gases such as $NO_x$ [NO, $NO_2$, $N_2O_3$ (x=3/2), etc.], $O_2$ and $H_2O$. However, these gases are virtually always present in practical situations, such as when $N_2O$ from waste gases is decomposed.

A further disadvantage of the catalysts as claimed in the prior art is that they can sometimes be obtained only by relatively complicated processes or in any case multistage processes.

The invention therefore aims at providing an alternative method for the catalytic decomposition of $N_2O$, also in the presence of $NO_x$, whereby the above disadvantages are eliminated either partly or preferably completely. Another aim of the invention is to provide a catalyst for use in this method, as well as a method for the preparation of this catalyst.

The catalysts as claimed in the invention ensure a good conversion of $N_2O$ even at low temperatures, are stable during the decomposition reaction (decomposition of $N_2O$ into $N_2$ and $O_2$) and also ensure a good conversion and have a good stability when the $N_2O$-containing gas also contains other gases (such as NO, $NO_2$, $N_2O_3$, etc., as well as $O_2$ and $H_2O$). It has been found surprisingly that the simultaneous deposition of two catalytically active metals in a single step of preparation ensures a better conversion of $N_2O$ than a similar catalyst that has the same concentrations of the two catalytically active metals (M1 and M2) but is prepared sequentially in two steps. It is also an advantage that no hydrocarbon has to be added to the $N_2O$-containing gas. These catalysts are therefore eminently suitable for decomposing $N_2O$. Finally, simultaneous loading is an advantage over sequential loading.

The present invention relates to a method for the catalytic decomposition of $N_2O$ in a gas containing $N_2O$ and NO in the presence of a catalyst, in which method the $N_2O$- and $NO_x$-containing gas is brought into contact with the catalyst, where the catalyst comprises a zeolite that is loaded with a first metal chosen from a group of noble metals, comprising ruthenium, rhodium, palladium, silver, rhenium, osmium, iridium, platinum and gold, and in particular from a group of noble metals comprising ruthenium and platinum, and with a second metal chosen from a group of transition metals, comprising chromium, manganese, iron, cobalt, nickel and copper, especially iron, where the zeolite is chosen in particular from a group comprising FER (ferrierite) and BEA (zeolite beta), and where the loading of the zeolite with metals is effected by loading the zeolite simultaneously with the noble metal and the transition metal. The $N_2O$- and $NO_x$-containing gas can be brought into contact with the catalyst in a reactor (or reactor chamber), which contains the catalyst.

The invention also provides a method for the preparation of a catalyst for the catalytic decomposition of $N_2O$ in an $N_2O$- and $NO_x$-containing gas, where the catalyst contains a zeolite and the preparation of the catalyst involves the simultaneous loading of the zeolite with a first metal chosen from a group of noble metals, comprising ruthenium, rhodium, palladium, silver, rhenium, osmium, iridium, platinum and gold, in particular from a group of noble metals comprising ruthenium and platinum, and with a second metal chosen from a group of transition metals, comprising chromium, manganese, iron, cobalt, nickel and copper, especially iron.

Furthermore, the invention also provides a catalyst that can be obtained by this method, and which contains for example 0.00001-4 wt-% of the first metal and 0.1-10 wt-% of the second metal, also covering the use of this catalyst for the decomposition of $N_2O$. In particular, the catalyst contains Fe,Pt-BEA, that is to say, a zeolite that has been loaded with iron and platinum.

DESCRIPTION OF THE INVENTION

The $N_2O$-containing gas can be for example a waste gas from the synthesis of nitric acid or for example a waste gas that is released in the production of nylon precursors. The gas can also contain oxygen and/or water. Unlike most catalysts as claimed in the prior art, the catalyst as claimed in the present invention loses little or none of its activity in the presence of oxygen, water or both. This is the case in particular if the water is present in an amount of up to about 5-10 vol-% (i.e. volume-%; volume-% refers to the volume of the $N_2O$-containing gas, including any $NO_x$, $O_2$ and $H_2O$, etc. that may be present). Oxygen can be present in an amount of for example up to about 20%, e.g. 0.5-20 vol-%. $NO_x$ can also be present, for example in an amount of about 10 ppm to 5% of $NO_x$, for example 10 ppm to 1 vol-% of $NO_x$. In particular, the $N_2O$- and $NO_x$-containing gas has an $N_2O/NO_x$ ratio in the range of 1-10,000 mol/mol, especially 1-1000 mol/mol.

In the case of one of the embodiments, the invention therefore relates to a method in which the $N_2O$- and $NO_x$-containing gas also contains oxygen and/or water.

Therefore the term "$N_2O$- and $NO_x$-containing gas" means in the context of the invention that the gas contains in any case $N_2O$ and $NO_x$, and it may also contain some other gases, such as $N_2$, $H_2O$, $O_2$, etc. This gas (or gaseous mixture) can be brought into contact with a catalyst in the way known to the expert in the field. The term "decomposition of $N_2O$ in an $N_2O$-containing gas" means that the $N_2O$ that is present in the gas is in any case partly decomposed into $N_2$ and $O_2$ (with the aid of the catalyst as claimed in the invention).

In particular, the invention relates to a method for the catalytic decomposition of $N_2O$ in an $N_2O$-containing gas, comprising:

the provision of a catalyst, where the catalyst contains a zeolite that is loaded with a first metal chosen from a group of noble metals, comprising ruthenium, rhodium, palladium, silver, rhenium, osmium, iridium, platinum and gold, in particular from noble metals comprising ruthenium and platinum, and with a second metal chosen from a group of transition metals, comprising chromium, manganese, iron, cobalt, nickel and copper, especially iron, and the provision of the $N_2O$- and $NO_x$-containing gas and the conduction of the $N_2O$- and $NO_x$-containing gas through a space that contains the catalyst, where the $N_2O$- and $NO_x$-containing gas, the space, or both are heated if required.

The catalyst is in particular a zeolite that is loaded with a noble metal and a transition metal, the loading of the zeolite with the metals being effected by loading the zeolite simultaneously with the noble metal and the transition metal.

If required, the decomposition reaction can be accompanied by heating the charge to a temperature at which (complete or partial) decomposition of $N_2O$ takes place; however, being a waste gas, the $N_2O$- and $NO_x$-containing gas may already be at the required temperature, or it may have been cooled down to the required temperature. The space in question is for example a reactor (or a reactor chamber), known to the expert in the field.

In the description of the invention, NO is defined as any nitrogen oxide for which x is 1 or more, such as NO, $NO_2$, $N_2O_3$, etc. It does not cover $N_2O$, i.e. laughing gas. NO is generally at equilibrium with nitrogen oxides for which x is greater than 1. The catalyst as claimed in the invention has been found to be eminently suitable for the decomposition of $N_2O$ in an $N_2O$- and $NO_x$-containing gas without its stability being impaired by the possible presence of NO, $NO_2$, etc. (i.e. $NO_x$). One of the embodiments of the invention therefore provides a method in which the $N_2O$- and $NO_x$-containing gas also contains $NO_x$, where x is 1 or greater than 1, such as for example x=1, 3/2, 2, etc. The gas can of course also contain combinations of such $NO_x$ species. In particular, the $N_2O$- and $NO_x$-containing gas contains at least $N_2O$, NO and $NO_2$.

In particular, the present invention relates to the decomposition of $N_2O$, where the $N_2O$- and $NO_x$-containing gas contains basically no hydrocarbon. The $N_2O$-containing gas preferably contains less than 50 ppm of hydrocarbon, calculated on the total amount of the $N_2O$-containing gas, or for example less than 3 vol-% of hydrocarbon, calculated on the total amount of $N_2O$ in the $N_2O$- and $NO_x$-containing gas. More especially, the gas basically contains no $C_nH_{2n+2}$ (where n is preferably chosen from 1-4, including all the isomers).

The process conditions of the method for the catalytic decomposition of $N_2O$ in an $N_2O$- and $NO_x$-containing gas will depend on the application in question. The expert in the field will generally choose the catalyst volume, the gas flow rate, the temperature, pressure, etc. in such a way that the best results are obtained in the conversion. Good results are obtained for example with an $N_2O$ content of about 100 ppm or more, for example about 100-100,000 ppm of $N_2O$ in the $N_2O$- and $NO_x$-containing gas. Under practical conditions, the amount of $N_2O$ will generally be between about 100 and 3000 ppm in the $N_2O$- and $NO_x$-containing gas. The $N_2O$- and $NO_x$-containing gas is preferably introduced at a gas hourly space velocity (GHSV) of about 200-200,000 $h^{-1}$ and preferably 1000-100,000 $h^{-1}$, this value being calculated on the volume of catalyst used. The pressure of the $N_2O$- and $NO_x$-containing gas will depend on the application in question and can be about 1-50 bar(a) and preferably about 1-25 bar(a) [bar(a)=bar atmosphere]. The process can be carried out at a relatively low temperature. The conversion of $N_2O$ starts at about 300° C. A virtually complete conversion can be obtained already at about 375° C., depending on the conditions, such as the gas space velocity, the catalyst volume, the catalyst load, etc. The reaction is preferably carried out at a temperature of between 300 and 600° C., such as between 350 and 600° C., and more preferably between 350 and 500° C.

The method as claimed in the invention can be used for example for the catalytic reduction of $N_2O$ that is released by emergency power generating sets, by gas engines, installations for nitric acid production, $N_2O$ that is released during caprolactam production, or when burning coal in a fluidized bed, etc. The invention therefore also relates to the use of the catalyst as claimed in the invention e.g. for the catalytic decomposition of $N_2O$. The method as claimed in the invention can also be used in combination with a catalyst for the elimination of $NO_x$ that is released for example in the industrial production of nitric acid.

The zeolites used as claimed in the invention are for example the following ones, which are known to the expert in the field under their abbreviations (see e.g. Atlas of Zeolite Framework Types, by Ch. Baerlocher, W. M. Meier and D. H. Olson, 2001, Elseviers Science, ISBN 0-444-50701-9): ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, *BEA, BEC, B1K, BOG, BPH, BRE, CAN, CAS, CFI, CGF, CGS, CHA, —CHI, —CLO, CON, CZP, DAC, DDR, DFO, DFT, DOH, DON, EAB, EDI, EMT, EP1, ER1, ESV, ETR, EUO, FAU, FER, FRA, GIS, GME, GON, GOO, HEU, IFR, ISV, ITE, ITH, ITW, IWR, IWW, JBW, KFI, LAU, LEV, LIO, LOS, LOV, LTA, LTL, LTN, MAZ, MEI, MEL, MEP, MER, MFI, MFS, MON, MOR, MSO, MTF, MTN, MTT, MTW, MWW, NAB, NAT, NES, NON, NPO, OFF, OSI, OSO, —PAR, PAU, PHI, PON, RHO, —RON, RSN, RTE, RTH, RUT, RWY, SAO, SAS, SAT, SAV, SBE, SBS, SBT, SFE, SFF, SFG, SFH, SFN, SGT, SOD, SSY, STF, STI, STT, TER, THO, TON, TSC, UEI, UFI, UOZ, USI, VET, VFI, VNI, VSV, WEI, —WEN, YUG, and ZON. Combinations of (loaded) zeolites can also be used.

The preferred zeolites are those based on silicon and aluminum and having an Si/Al ratio of 2-60, and preferably 2.5-30. Good results are obtained for example with a zeolite chosen from a group comprising FAU, FER, CHA, MOR, MFI, BEA, EMT, CON, BOG and ITQ-7. In a preferred embodiment, the invention relates to a method in which the zeolite is chosen from a group comprising FER, CHA, MOR and BEA. BEA and/or FER are used in particular, and more especially BEA.

There are various ways of preparing the catalyst according to the invention. The zeolite can be loaded by methods like those which are well known to the expert in the field, for example it is prepared by wet impregnation [in which the volume of liquid with the (dissolved) salt is greater than the pore volume of the zeolite], or it can be prepared by pore volume impregnation, also known as dry impregnation or incipient wetness [where the volume of liquid with the (partly dissolved) salt is the same as the pore volume of the zeolite]; or it can be prepared by ion exchange [exchange in the liquid phase, where the metals to be exchanged are dissolved at least partly in the liquid phase in the form of ions (or complexed ions), and in which the zeolite is stirred in the liquid with the ions to be exchanged, as is well known to the expert in the field], or it is prepared by CVD. The catalytic decomposition of $N_2O$ in an $N_2O$- and $NO_x$-containing gas is preferably carried out with a zeolite that is loaded with the first and the second metal by ion exchange or impregnation and is used for the catalytic decomposition of $N_2O$ in an $N_2O$- and $NO_x$-containing gas either as such or after some optional further steps, such as drying, screening and/or calcining, application to a carrier, etc. In a preferred embodiment, a method is used in which the zeolite is loaded with the first and second metal by ion exchange.

In this invention, the metal used is an element that is known to the expert in the field as metal (for example metals from Groups 3-12 of the Periodic Table according to the IUPAC notation). In the invention, the transition metals are metals from Groups 3-12 of the Periodic Table (according to the IUPAC notation), which are also known as Groups Ib, IIb-VIIb and VIII. The second metal is a transition metal that is not a noble metal at the same time. Noble metals are the metals Ru, Rh, Pd, Ag, Re, Os, Ir, Pt and Au.

The loading of the zeolite generally involves the use of salts in solution (for ion exchange), where the metal is present in the ionic form (usually in water), or it involves the use of solutions [for wet or pore volume impregnation (incipient wetness)], where the metal is present as an ion in solution and/or as an ion in a salt compound. Since it is preferred to use ion exchange (in the liquid phase) or pore volume impregnation, the catalyst—after preparation and before calcining— generally contains a zeolite in which the metal is present in the ionic form (and is coordinated with Al). After calcining and/or during the performance of the method according to the invention, part of the metal present in ionic form can be converted, on the exchanged sites, into the oxide and/or the metal, for example by the clustering of the particles. This behaviour of zeolites after an exchange with metals is well known to the expert in the field. The term "metal" in the invention therefore also means metal ion, and for example after the loading (the application of the metals) the zeolite can also contain metal oxides or metal salts (e.g. chlorides, oxychlorides, nitrates, sulfates, etc.).

The zeolite is generally dried after loading. It can then be calcined. Instead of calcining (heating in air or oxygen), it can also be reduced (heated in a reducing atmosphere) or activated in an inert atmosphere (heated in an inert atmosphere). The expert in the field knows these operations as "post-modification procedures". Calcining is usually carried out in air at a temperature of for example 400-550° C.; reduction can be effected with hydrogen at a temperature of for example 300-500° C.; inert activation can be brought about with the aid of nitrogen, argon, helium, etc. at a temperature of for example about 300-550° C. These procedures generally take a few hours.

Specific preferred embodiments involve methods and catalysts according to the invention in which the second metal comprises Fe, and the zeolite comprises FER and/or BEA.

Documents DE 102006013234/WO 2007107371 describe a catalytic converter characterised in that it contains a composition comprising palladium, platinum, tin oxide, a carrier oxide and zeolite. Optionally the catalytic converter can be doped with oxides of gallium, indium or iron. These documents also describe a method for producing the catalytic converter, to the use thereof for removing pollutants from lean internal combustion engines and exhaust gases, and to methods for removing pollutants from the exhaust gases of lean internal combustion engines using said catalytic converter, by oxidising carbon monoxide and hydrocarbons while removing soot particles by oxidation. However, this technology is not related to $N_2O$ decomposition. Further, these documents describe the simultaneous loading of binder and zeolite. Further, these documents describe systems that may comprise undesired further metals.

In the present invention, the catalyst may further comprise a binder, in addition to the metal loaded zeolite, wherein the binder is preferably not loaded with the metals with which the zeolite is loaded. In another embodiment, the catalyst may further comprise a binder, in addition to the metal loaded zeolite, wherein the binder is preferably not loaded with the first and the second metal, wherein the first metal is chosen from a group of noble metals, comprising ruthenium, rhodium, palladium, silver, rhenium, osmium, iridium, platinum and gold, and in particular from a group of noble metals comprising ruthenium and platinum, and wherein the second metal is chosen from a group of transition metals comprising chromium, manganese, iron, cobalt, nickel and copper, especially iron. Preferably, the binder is not loaded with any of these metals, preferably no metal at all, and is combined with the zeolite, after the zeolite has been loaded according to the method of the invention. Hence, the method for preparing the catalyst may further comprise combining the thus obtained catalyst with a binder, wherein the binder is preferably a binder not loaded with ruthenium, platinum and iron, more preferably not loaded with any of the first or second metals indicated herein.

The zeolite can, especially together with a binder, be provided to a support, such as a monolith. Hence, the invention also relates to a support, such as a monolith, being provided with the catalyst. For instance, the catalyst can be washcoated to the monolith. Hence, the method for preparing the catalyst may further comprise combining the thus obtained catalyst with a monolith. Preferably, the monolith is a monolith not loaded with the first and the second metal, wherein the first metal is chosen from a group of noble metals, comprising ruthenium, rhodium, palladium, silver, rhenium, osmium, iridium, platinum and gold, and in particular from a group of noble metals comprising ruthenium and platinum, and wherein the second metal is chosen from a group of transition metals comprising chromium, manganese, iron, cobalt, nickel and copper, especially iron. Preferably, the monolith is not loaded with any of these metals, preferably no metal at all. In an embodiment, the monolith is not loaded with ruthenium, platinum and iron.

In a specific embodiment, the zeolite is exclusively loaded with the first metal and the second metal, especially with Fe and one or more of Pt and Ru The invention also relates to a method and a catalyst in which the zeolite loaded with metals is chosen from a group comprising Fe,Rh-FER, Fe,Ir-FER, Fe,Ru-FER, Fe,Pt-FER, Fe,Pt-MOR, Fe,Rh-BEA, Fe,Ir-BEA, Fe,Ru-BEA and Fe,Pt-BEA, especially the FER and BEA variants.

The catalyst according to the invention preferably comprises a zeolite that contains about 0.00001-4 wt-% of the first metal (0.00001 wt-% is 10 ppm) and bout 0.1-10 wt-% of the second metal. More especially the zeolite contains about 0.01 to 0.5 wt-% of the first metal and about 0.5 to 4 wt-% of the second metal. Combinations of "first metals" and combinations of "second metals", etc. can of course be also used, such as for example: Fe,Ir,Ru-FER, Co,Ni,Ir-MOR and Co,Ni,Rh, Os-MOR, etc. A first and a second loading operation similarly do not rule out one or more further loading operations. The notation M2-M1-zeolite and M2,M1-zeolite indicate respectively that the zeolite is loaded first with the first metal (M1) and then with the second metal M2), and that the zeolite is loaded with the two metals (M2,M1) simultaneously. Preferably however, the zeolite is at least loaded with Fe and one or more of Ru and Pt, and optionally is loaded (simultaneously) with (exclusively) one of the other herein mentioned first and/or second metals. Hence, the method may also involve the simultaneously loading with one or more other metals (other than Fe and one or more of Ru and Pt) selected from the group consisting of ruthenium, rhodium, palladium, silver, rhenium, osmium, iridium, platinum, gold, chromium, manganese, iron, cobalt, nickel and copper.

The catalyst according to the invention preferably contains only the zeolite in question. In another embodiment, the catalyst comprises the zeolite and a certain amount of a carrier, for example 0.1-50 wt-% of bochmite, e.g. in the form of pellets, or it is applied on a monolith, as is familiar to the expert in the field. The amounts of the metals (first metal and second metal) are calculated on the amount of zeolite, the metals being present on and in the zeolite.

Well-known salts, such as for example readily soluble nitrates, are used for the ion exchange. The zeolite used can be in the H, Na, K or $NH_4$ form, such as for example $NH_4$-BEA, H-FER, etc. The ion exchange process is continued long enough, or it is repeated often enough, to ensure that about 0.00001-4 wt-% of the first metal is present in the zeolite. The zeolite can also be loaded in other ways (by pore volume impregnation, etc.). The zeolite is then preferably filtered off, washed and possibly dried. The zeolite is subsequently loaded with 0.1-10 wt-% of the second metal. This can be carried out by ion exchange (in the liquid phase) or by pore volume impregnation (the incipient wetness technique), etc. (see above). The zeolite then dried and if required calcined.

EXAMPLES

Test Apparatus

The catalytic decomposition of $N_2O$ (and possibly $NO_x$) was studied in a semi-automatic experimental setup. The gases were introduced with the aid of Mass Flow Controllers (MFCs), and water was added with the aid of a saturator that had bean set to the right temperature. The pipes were heated to 130° C. to prevent condensation. The experiments were carried out in a quartz reactor with an internal diameter of 0.6-1 cm, placed in an oven. The 0.25-0.5 mm screening fraction of the catalyst was placed on a quartz gauze. The gas phase was subjected to quantitative analysis by a calibrated Bomen MB100 Fourier-transform infrared (FTIR) spectrometer fitted with a model 9100 gas analyzer, or by means of a Perkin Elmer GC-TCD. The carrier gas (balance) in the example was $N_2$.

Typically, the $N_2O$ conversion was measured as a function of temperature and as a function of time. The catalyst was heated at 2 degrees C./min to 260 deg C. in air to dehydrate the catalyst. Subsequently the catalyst was exposed to the reaction mixture. At each temperature the catalyst was allowed to reach a steady state during 15 minutes equilibration time after which the FTIR measurement (3 times, interval 5 min) took place. Subsequently, the temperature was increased 10 degrees C. with 2 degrees C./min and the measurement procedure was repeated until the highest temperature, 510 degrees C. was reached.

Example 1

Preparation of Loaded Zeolites

TABLE 1

| Catalysts prepared | |
|---|---|
| Catalyst | Description |
| Cat 1 | FeRuBEA |
| Cat 2 | FeBEA |
| Cat 3 | FeRuBEA2 |
| Cat 4 | FePtBEA |
| Cat 5 | FeRuBEA3 |
| Cat PA1 | Fe-ZSM-5 |
| Cat PA2 | Ru-ZSM-5 |
| Cat PA3 | Fe—Ru-ZSM-5 |
| Cat 6 | FePtBEA seq. |
| Cat 7 | FePtBEA co. |
| Cat 8 | FeRuBEA co. |
| Cat 9 | FePtBEA co. |
| Cat 10 | FePtPdSnBEA co. |

Cat 1: Fe—Ru-BEA

This catalyst was prepared by co-ion exchange between Zeolyst BEA CP814 in the liquid phase and $FeCl_2.4H_2O$ and $Ru(NH_4)_6Cl_3$ over 16 hours at 80° C. until the zeolite had been loaded with 0.3 wt-% of Ru and 0.7 wt-% of Fe. The zeolite was then filtered off, thoroughly washed, and dried at 80° C. The catalyst was calcined in situ for 5 h at 550° C. before the reaction.

Cat 2: Fc-BEA

This catalyst was prepared by ion exchange between Zeolyst BEA CP814 in the liquid phase and $FeCl_2.4H_2O$ over 16 hours at 80° C. until the zeolite had been faded with 0.7 wt-% of Fe. The zeolite was then filtered off, thoroughly washed, and dried at 80° C. The catalyst was calcined in situ for 5 h at 550° C. before the reaction.

Cat 3: Fe—Ru-BEA2

This catalyst was prepared by co-ion exchange between Zeolyst BEA CP814 in the liquid phase and $FeCl_2.4H_2O$ and $Ru(NH_4)_6Cl_3$ over 16 hours at 80° C. until the zeolite had been loaded with 0.02 wt-% of Ru and 0.7 wt-% of Fe (by ICP analysis). The zeolite was then filtered off, thoroughly washed, and dried at 80° C. The catalyst was calcined in situ for 5 h at 550° C. before the reaction.

Cat 4: Fe—Pt-BEA

This catalyst was prepared by co-ion exchange between Zeolyst BEA CP814 in the liquid phase and $FeCl_2.4H_2O$ and $Pt(NH_3)_4Cl_2$ over 16 hours at 80° C. until the zeolite had been loaded with 0.05 wt-% of Pt and 0.7 wt-% of Fe (by ICP analysis). The zeolite was then filtered off, thoroughly washed, and dried at 80° C. The catalyst was calcined in situ for 5 h at 550° C. before the reaction.

Cat 5: Fe—Ru-BEA3

This catalyst was prepared by the sequential loading of the zeolite with the catalytically active metals. Zeolyst BEA CP814 was subjected to ion exchange with $Ru(NH_4)_6Cl_3$ in the liquid phase for 16 hours at 80° C. The zeolite was then filtered off, thoroughly washed, and dried at 80° C. The Ru-BEA catalyst was then loaded with 0.7 wt-% of Fe (ICP analysis), using $FeCl_2.4H_2O$. The Ru load amounted to 0.02 wt-% (by ICP analysis). The catalyst was calcined in situ for 5 h at 550° C. before the reaction Cat PA1: Fe-ZSM-5

This catalyst was prepared by ion exchange between Alsi Penta SN27 zeolite ZSM-5 in the liquid phase and $FeCl_2.4H_2O$ over 16 hours at 80° C. (which was calculated to give a load of 2.5 wt-% of Fe). The zeolite was then filtered off, thoroughly washed, and dried at 80° C. The catalyst was calcined in situ for 5 h at 550° C. before the reaction.

Cat PA2: Ru-ZSM-5

This catalyst was prepared by ion exchange between Alsi Penta SN27 zeolite ZSM-5 in the liquid phase and $Ru(NH_4)_6Cl_3$ over 16 hours at 80° C. (which was calculated to give a load of 0.3 wt-% of Ru). The zeolite was then filtered off, thoroughly washed, and dried at 80° C. The catalyst was calcined in situ for 5 h at 550° C. before the reaction.

Cat PA3: Fe—Ru-ZSM-5

This catalyst was prepared by co-ion exchange between Alsi Penta SN27 zeolite ZSM-5 in the liquid phase and $FeCl_2.4H_2O$ and $Ru(NH_4)_6Cl_3$ over 16 hours at 0° C. (which was calculated to give a load of 0.3 wt-% of Ru and 2.5 wt-% of Fe). The zeolite was then filtered off, thoroughly washed, and dried at 80° C. The catalyst was calcined in situ for 5 h at 550° C. before the reaction.

Cat 6: FePtBEA seq.

The catalyst was prepared with the aid of sequential ion exchange. Zeolyst EA CP814e was first exchanged with $(NH_3)_4Pt(NO_3)_2$ for 16 h at 80° C., subsequently washed, filtered and dried at 80° C. The Fe loaded Fe-BEA was then exchanged with $FeCl_2.4H_2O$ for 16 h at 80° C., to achieve a loading of 0.50 wt. % Pt (ICP analysis) and 1.45 wt. % Fe (ICP analysis). The zeolite was then filtered off and washed thoroughly and dried at 80° C. The catalyst was calcined before reaction at 550° C.

Cat 7: FePtBEA Co.

The catalyst was prepared with the aid of Co-ion exchange of Zeolyst BEA CP814e with $FeCl_2.4H_2O$ and $(NH_3)_4Pt(NO_3)_2$ for 16 h at 80° C., to achieve a loading of 0.05 wt. % Pt (ICP analysis) and 1.45 wt % Fe (ICP analysis). The zeolite was then filtered off and washed thoroughly and dried at 80° C. The catalyst was calcined before reaction at 550° C.

Cat 8: Fe—Ru-BEA Co.

The catalyst was prepared with the aid of Co-ion exchange of Zeolyst BEA CP814e with $FeCl_2.4H_2O$ and $Ru(NH_4)_6Cl_3$ for 16 h at 80° C., to achieve a load g of 0.1 wt %% Ru (ICP analysis) and 1.45 wt % Fe (ICP analysis). The zeolite was then filtered off and washed thoroughly and dried at 80° C. The catalyst was calcined before reaction at 550° C.

Cat 9: FePtBEA Co.

The catalyst was prepared with the aid of Co-ion exchange of Zeolyst BEA CP814e with $FeCl_2.4H_2O$ and $(NH_3)_4Pt(NO_3)_2$ for 16 h at 80° C., to achieve a loading of 0.55 wt. % Pt (ICP analysis) and 0.60 wt % Fe (ICP analysis). The zeolite was then filtered off and washed thoroughly and dried at 80° C. The catalyst was calcined before reaction at 550° C.

Cat 10: FePtPdSnBEA Co.

The catalyst was prepared with the aid of Co-ion exchange of Zeolyst BEA CP814e with $FeCl_2.4H_2O$, $(NH_3)_4Pt(NO_3)_2$, $FeCl_2.4H_2O$ and $Pd(NH_3)_4(NO_3)_2$ for 16 h at 80° C., to achieve a loading of 0.59 wt. % Pt (ICP analysis), 0.60 wt % Fe (ICP analysis), 1.1 wt % Pd and 1.1 wt % Sn. The zeolite was then filtered off and washed thoroughly and dried at 80° C. The catalyst was calcined before reaction at 550° C.

Example 2

Reference Example

Decomposition of $N_2O$ with the Aid of ZM-5, Exchanged with Fe, Fe/Ru and Ru

The catalysts PA1-PA3, mentioned in Example 1, which are known from the prior art, were used for the decomposition of $N_2O$ under the conditions described in Table 2.

TABLE 2

| Reaction conditions used in Example 2 | |
|---|---|
| Volume | 0.3 ml |
| Gas flow rate | 150 ml/min |
| GHSV | 30,000 h$^{-1}$ |
| T | Variable |
| P | 1 bar(a) |
| $N_2O$ | 1500 ppm |
| NO | 200 ppm |
| $H_2O$ | 0.5% |
| $O_2$ | 2.5% |
| $N_2$ | bal. |

The following results were obtained here:

TABLE 3

| Results obtained in Example 2 | | | |
|---|---|---|---|
| Temperature, ° C. | Conversion (%) of $N_2O$ with Fe—Ru-ZSM-5 (Cat PA3) | Conversion (%) of $N_2O$ with Fe-ZSM-5 (Cat PA1) | Conversion (%) of $N_2O$ with Ru-ZSM-5 (Cat PA2) |
| 367 | 6 | 8 | 9 |
| 377 | 10 | 9 | 11 |
| 387 | 16 | 14 | 15 |
| 396 | 23 | 22 | 17 |
| 406 | 33 | 32 | 25 |
| 415 | 45 | 45 | 32 |
| 425 | 59 | 56 | 41 |
| 434 | 73 | 68 | 48 |
| 444 | 85 | 79 | 60 |
| 454 | 93 | 88 | 75 |
| 463 | 97 | 94 | 83 |
| 473 | 100 | 98 | 93 |
| 482 | 100 | 100 | 98 |
| 491 | 100 | 100 | 100 |

These data show that co-ion exchange (the simultaneous exchange of the first and the second metal) in the liquid phase, with ZSM-5 zeolite, that is to say the simultaneous loading of the zeolite with Fe and Ru hardly improves the catalyst in comparison with the singly loaded Fe-ZSM-5.

Example 3

Decomposition of $N_2O$ with the aid of BEA, Exchanged with Fe/Ru an Fe $N_2O$ was decomposed under the conditions described in Table 4, using Catalysts 1 and 2 from Example 1.

TABLE 4

Reaction conditions used in Example 3

| | |
|---|---|
| Volume | 0.3 ml |
| Gas flow rate | 150 ml/min |
| GHSV | 30,000 h$^{-1}$ |
| T | Variable |
| P | 1 bar(a) |
| $N_2O$ | 1500 ppm |
| NO | 200 ppm |
| $H_2O$ | 0.5% |
| $O_2$ | 2.5% |
| $N_2$ | bal. |

The results obtained here are shown below.

TABLE 5

Results obtained in Example 3

| Temperature, °C. | Conversion (%) of $N_2O$ with FeRu-BEA (Cat 1) | Temperature, °C. | Conversion (%) of $N_2O$ with FeBEA (Cat 2) |
|---|---|---|---|
| 319 | 0 | 321 | 0 |
| 339 | 1 | 342 | 2 |
| 359 | 4 | 360 | 5 |
| 380 | 13 | 381 | 10 |
| 400 | 32 | 399 | 18 |
| 420 | 62 | 418 | 28 |
| 440 | 90 | 437 | 47 |
| 460 | 99 | 456 | 73 |
| 480 | 100 | 475 | 97 |
| 500 | 100 | 494 | 100 |

These data show that the simultaneous loading (co-ion exchange) of the zeolite with Fe and Ru gives a clearly improved catalyst in comparison with the singly loaded analogue, Fe-BEA.

Example 4

Decomposition of $N_2O$ with the Aid of BEA, Exchanged with Fe/Ru and Fe/Pt

Catalysts 3 and 4 were used for the decomposition of $N_2O$ under the conditions described in Table 6.

TABLE 6

Reaction conditions used in Example 4

| | |
|---|---|
| Volume | 0.1 ml |
| Gas flow rate | 100 ml/min |
| GHSV | 60,000 h$^{-1}$ |
| T | 490 degrees C. |
| P | 1 bar(a) |
| $N_2O$ | 1500 ppm |
| NO | 200 ppm |
| $H_2O$ | 0.5% |
| $O_2$ | 2.5% |
| $N_2$ | bal. |

TABLE 7

Results of Example 4

| Time, hours | Conversion (%) of $N_2O$ with FePtBEA (Cat 4) | Time, hours | Conversion (%) of $N_2O$ with FeRuBEA2 (Cat 3) |
|---|---|---|---|
| 0 | 91 | 0 | 92 |
| 20 | 92 | 20 | 93 |
| 40 | 92 | 40 | 93 |
| 60 | 92 | 60 | 93 |
| 80 | 93 | 80 | 92 |
| 100 | 93 | 100 | 92 |
| 120 | 93 | 120 | 92 |
| 140 | 94 | 140 | 92 |
| | | 160 | 92 |
| | | 180 | 92 |
| | | 200 | 93 |
| | | 220 | 92 |
| | | 230 | 92 |

These data show that the simultaneous loading (co-ion exchange) of the zeolite with Fe and Ru, or with Fe and Pt gives a markedly stable $N_2O$ decomposition catalyst. The introduction of the second metal therefore clearly has a strong activity-increasing effect (see Example 3) without impairing the stability of the $N_2O$ conversion.

Example 5

Decomposition of $N_2O$ with the Aid of BEA, Exchanged with Fe/Ru by Sequential Loading and Simultaneous Loading Catalysts 3 and 5 from Example 1 were used to decompose $N_2O$ under the conditions described in Table 4.

TABLE 8

Reaction conditions used in Example 5

| | |
|---|---|
| Volume | 0.2 ml |
| Gas flow rate | 100 ml/min |
| GHSV | 30,000 h$^{-1}$ |
| T | Variable |
| P | 1 bar(a) |
| $N_2O$ | 1500 ppm |
| NO | 200 ppm |
| $H_2O$ | 0.5% |
| $O_2$ | 2.5% |
| $N_2$ | bal. |

The results obtained here are listed below.

TABLE 9

Results obtained in Example 5

| Temperature, °C. | Conversion (%) of $N_2O$ with FeRuBEA2 (Cat 3) | Temperature, °C. | Conversion (%) of $N_2O$ with FeRuBEA3 (Cat 5) |
|---|---|---|---|
| 317 | 3 | 318 | 2 |
| 346 | 5 | 348 | 2 |
| 365 | 7 | 367 | 3 |
| 385 | 12 | 387 | 6 |
| 405 | 22 | 406 | 14 |
| 424 | 40 | 426 | 31 |
| 443 | 66 | 445 | 53 |
| 463 | 89 | 465 | 80 |
| 482 | 98 | 484 | 97 |
| 501 | 100 | 503 | 100 |

These data show that the simultaneous loading (co-ion exchange) of the eolite with Fe and Ru gives a markedly improved catalyst in comparison with the segue tially loaded FeRuBEA.

Example 6

Decomposition of $N_2O$ Using Fe/Ru-ZSM-5 (PA3) and Fe/Ru-BEA (Cat 1) Co-Exchanged with Fe and Ru Using catalyst PA3 from Example 1, and Cat 1 (Fe—Ru-BEA) $N_2$ was decomposed under the conditions listed in Table 2. The following results were obtained:

TABLE 10

Results Example 6

| Temperature (° C.) | Conversion (%) $N_2O$ Fe—Ru-ZSM-5 (Cat PA3) | Temperature (° C.) | Conversion (%) $N_2O$ Fe—Ru-BEA (Cat 1) |
|---|---|---|---|
| 396 | 23 | 400 | 32 |
| 415 | 45 | 420 | 62 |
| 444 | 85 | 440 | 90 |
| 463 | 97 | 460 | 99 |
| 491 | 100 | 480 | 100 |

It was concluded that the simultaneously loaded BEA with Fe and Ru gives a clearly improved catalyst as compared to the simultaneously loaded ZSM-5 with Fe and Ru. The positive effect of combining Fe and Ru with co-ion exchange was observed for BEA zeolite while for ZSM-5 zeolite the combination of Fe and Ru with co-ion exchange also did not significantly improve the $N_2O$ conversion compared to the Fe-ZSM-5 analogue (see Example 2). Clearly, the beneficial synergy of Fe and Ru established by co-ion exchange of Fe and Ru is dependent on the zeolite type.

Example 7

Stability of $N_2O$ Decomposition Using Fe/Ru-ZSM-5 en Fe/Ru-BEA Co-Exchanged with Fe, en Ru Using catalyst PA3 from Example 1, and catalyst 1 (Fc—Ru-BEA) $N_2O$ was decomposed under the conditions listed in Table 12.

TABLE 12

Conditions Example 7

| | Cat PA3: Fe—Ru-ZSM5 | Cat 1: Fe—Ru-BEA |
|---|---|---|
| Volume | 0.3 ml | 0.1 ml |
| Gas flow | 150 ml/min | 100 ml/min |
| GHSV | 30000 $h^{-1}$ | 60000 $h^{-1}$ |
| T | 430° C. | 490° C. |
| P | 1 bara | 1 bara |
| $N_2O$ | 1500 ppm | 1500 ppm |
| NO | 200 ppm | 200 ppm |
| $H_2O$ | 0.5% | 0.5% |
| $O_2$ | 2.5% | 2.5% |
| $N_2$ | bal. | bal. |

TABLE 13

Results Example 7:

| Time on stream (h) | Conversion (%) $N_2O$ Fe—Ru-ZSM5 (Cat PA3) | Time on stream (h) | Conversion (%) $N_2O$ FeRuBEA (Cat 1) |
|---|---|---|---|
| 0 | 64 | 0 | 92 |
| 10 | 61 | 20 | 93 |
| 20 | 59 | 40 | 93 |
| 40 | 57 | 60 | 93 |
| 50 | 55 | 80 | 92 |
| | | 100 | 92 |
| | | 120 | 92 |
| | | 140 | 92 |
| | | 160 | 92 |
| | | 180 | 92 |
| | | 200 | 93 |
| | | 220 | 92 |
| | | 230 | 92 |

It was concluded that the BEA simultaneously loaded with Fe and Ru gives a clearly more stable $N_2O$ decomposition catalyst as compared to the ZSM-5 simultaneously loaded with Fe and Ru. Fe—Ru-BEA shows constant $N_2O$ conversion during the time of the measurement period (in the present example it was 230 h) while Fe—Ru-ZSM-5 shows a constant decrease of $N_2O$ conversion amounting to approximately 10% point within 50 h on stream.

Example 8

Decomposition of $N_2O$ using FeRuBEA Co., Co-Ion Exchanged and FePtBEA Co., Co-Ion Exchanged with Fe and Pt Using Catalyst CAT 7, FePtBEA Co. and catalyst CAT 8, FeRuBEA Co. $N_2O$ was decomposed under the conditions listed in Table 13.

TABLE 13

| Conditions Example 8 | |
|---|---|
| Volume | 0.3 ml |
| Gas flow | 100 ml/min |
| GHSV | 45000 $h^{-1}$ |
| T | Varied |
| P | 1 bara |
| $N_2O$ | 1500 ppm |
| NO | 100 ppm |
| $N_2$ | bal. |

The following results were obtained:

TABLE 14

Results Example 8:

| Temperature (° C.) | Pseudo-first order constant $N_2O$ decomposition k (mmol/gPM.S.bar) FeRuBEA Co. | Temperature (° C.) | Pseudo-first order constant $N_2O$ decomposition k (mmol/gPM.S.bar) FePtBEA Co. |
|---|---|---|---|
| 341 | 40 | 339 | 99 |
| 360 | 114 | 359 | 172 |
| 380 | 290 | 379 | 321 |
| 400 | 481 | 398 | 624 |
| 419 | 1185 | 418 | 1204 |
| 439 | 2418 | 437 | 2442 |
| 458 | 4547 | 456 | 6185 |
| 478 | 5315 | 476 | 10765 |

The pseudo-first order rate constant is defined:

$k = -(F/(\text{mcat PM} \cdot p)) \cdot \ln(1-X)$ where F is total flow, mcat mass of the PM (precious metal, Pt and Ru respectively) in the catalyst, p is total pressure, and X is the conversion.

The rate constant compares the actual activity of the catalysts rather than the conversion. It was concluded that the co-ion exchanged simultaneously loaded BEA with Fe and Pt gives a clearly more active catalyst as compared to the simultaneously loaded BEA with Fe and Ru.

Example 9

Decomposition of $N_2O$ Using FePtBEA Seq. Sequentially Exchanged and FePtBEA Co., Co-Ion Exchanged with Fe and Pt Using catalyst Cat 6, FePtBEA seq. and catalyst CAT 7, FePtBEA Co., $N_2$ was decomposed under the conditions listed in Table 14.

TABLE 14

| Conditions Example 9 | |
|---|---|
| Volume | 0.3 ml |
| Gas flow | 100 ml/min |
| GHSV | 45000 h$^{-1}$ |
| T | Varied |
| P | 1 bara |
| $N_2O$ | 1500 ppm |
| NO | 100 ppm |
| $N_2$ | bal. |

The following results were obtained:

TABLE 15

Results Example 9:

| Temperature (° C.) | Pseudo-first order constant $N_2O$ decomposition k (mmol/gPt.S.bar) FePtBEA Seq. | Temperature (° C.) | Pseudo-first order constant $N_2O$ decomposition k (mmol/gPt.S.bar) FePtBEA Co. |
|---|---|---|---|
| 342 | 17 | 339 | 99 |
| 362 | 31 | 359 | 172 |
| 382 | 60 | 379 | 321 |
| 401 | 118 | 398 | 624 |
| 421 | 229 | 418 | 1204 |
| 440 | 517 | 437 | 2442 |
| 460 | 1097 | 456 | 6185 |
| 480 | 2660 | 476 | 10765 |

The pseudo-first order rate constant is defined:

$k = -(F/(\text{mcat Pt} \cdot p)) \cdot \ln(1-X)$ where F is total flow, mcat mass of the Pt in the catalyst, p is total pressure, and X is the conversion.

It was concluded that the co-ion exchanged simultaneously loaded BEA with Fc and Pt gives a clearly more active catalyst as compared to the BEA sequentially faded with Ru and Fc.

Example 10

Decomposition of $N_2O$ Using FePtBEA Co. and FePtPdSnBEA Co. Co-Exchanged with Fe, Pt, Sn and Pd Using catalyst Catalyst 9 FePtBEA Co. and catalyst 10 FePtPdSnBEA Co. $N_2O$ was decomposed under the conditions listed in Table 16.

TABLE 16

| Conditions Example 10 | |
|---|---|
| Volume | 0.3 ml |
| Gas flow | 100 ml/min |
| GHSV | 45000 h$^{-1}$ |
| T | Varied |
| P | 1 bara |
| $N_2O$ | 1500 ppm |
| NO | 100 ppm |
| $N_2$ | bal. |

The following results were obtained:

TABLE 17

Results Example 10:

| Temperature (° C.) | Conversion (%) $N_2O$ FePtBEA Co. (Cat 9) | Temperature (° C.) | Conversion (%) $N_2O$ FePtPdSnBEA Co. (Cat 10) |
|---|---|---|---|
| 342 | 10 | 340 | 4 |
| 362 | 17 | 360 | 7 |
| 382 | 31 | 380 | 11 |
| 401 | 51 | 399 | 20 |
| 421 | 75 | 419 | 35 |
| 440 | 96 | 438 | 56 |
| 460 | 100 | 458 | 79 |
| 480 | 100 | 477 | 97 |

It was concluded that the simultaneously loaded co-ionexchanged BEA with Fe and Pt gives a clearly improved $N_2O$ conversion catalyst as compared to the simultaneously loaded co-ion exchanged BEA with Fe, Pt, Pd and Sn. It is speculated that during the ion-exchange process of the salts of Fe, Pt, Pd and Sn the final location and presumably the state of the active Fe and Pt sites differ from the situation obtained with the salts of Fe and Pt only. Literature on $N_2O$ decomposition shows any examples of the importance of the location and nature of the active $N_2O$ decomposition sites. Altogether, the simultaneous exchange of BEA zeolite with salts of elements other than Fe and one or more of Pt and Ru, together with the salts of Fe and one or more of Pt and Ru may be detrimental for $N_2O$ decomposition conversion activity

The invention claimed is:

1. A method for the catalytic decomposition of $N_2O$ in an $N_2O$- and $NO_x$-containing gas, comprising bringing the $N_2O$- and $NO_x$-containing gas into contact with a catalyst, wherein
the catalyst comprises a zeolite that has been loaded with metals consisting of a noble metal selected from the group consisting of ruthenium and platinum, and a transition metal consisting of iron,
the zeolite is ferrierite (FER) or zeolite beta (BEA), and
the loading of the zeolite with the noble metal and the transition metal has been performed simultaneously.

2. The method as claimed in claim 1, wherein the zeolite has been loaded with the metals by means of ion exchange.

3. The method as claimed in claim 1, wherein the first noble metal comprises ruthenium.

4. The method as claimed in claim 1, wherein the noble metal comprises platinum.

5. The method as claimed in claim 1, wherein the catalyst comprises Fe,Pt-BEA.

6. The method as claimed in claim 1, wherein the zeolite comprises 0.00001-4 wt % of the noble metal and 0.1-10 wt % of the transition metal.

7. The method as claimed in claim 1, wherein the $N_2O$- and $NO_x$-containing gas is brought into contact with the catalyst at a temperature within the range of 350-600° C.

8. The method as claimed in claim 1, wherein the $N_2O$- and $NO_x$-containing gas has an $N_2O/NO_x$ molar ratio in the range of 1/1 to 10,000/1.

9. The method as claimed in claim 1, wherein the $N_2O$-containing gas also contains oxygen and/or water.

10. The method as claimed in claim 1, wherein the $N_2O$-containing gas contains less than 50 ppm of hydrocarbon.

11. The method as claimed in claim 1, further comprising eliminating the $NO_x$ using a catalyst.

12. The method according to claim 1, wherein the zeolite is exclusively loaded with the noble metal and the transition metal.

13. The method according to claim 1, wherein the catalyst comprises a combination of the zeolite and a binder, and the binder is not loaded with ruthenium, platinum and iron.

14. A method for the preparation of a catalyst for the catalytic decomposition of $N_2O$ in an $N_2O$- and $NO_x$-containing gas, comprising simultaneously and exclusively loading a zeolite of ferrierite (FER) or zeolite beta (BEA) with metals consisting of a noble metal selected from the group consisting of ruthenium and platinum and a transition metal consisting of iron.

15. The method according claim 14, further comprising combining the catalyst with a binder, wherein the binder is not loaded with ruthenium, platinum or iron.

16. The method according to claim 14, further comprising combining the catalyst with a monolith, wherein the monolith is not loaded with ruthenium, platinum or iron.

17. A catalyst prepared by the method as claimed in claim 14.

18. The catalyst as claimed in claim 17, wherein the zeolite contains 0.00001-4 wt % of the noble metal and 0.1-10 wt % of the transition metal.

19. The catalyst as claimed in claim 17, wherein the catalyst comprises Fe,Pt-BEA.

* * * * *